United States Patent
Lee

(10) Patent No.: US 8,104,057 B2
(45) Date of Patent: Jan. 24, 2012

(54) METHOD FOR SETTING TV ENVIRONMENT THROUGH USER AUTHENTICATION AND APPARATUS THEREOF

(75) Inventor: Jung-won Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1437 days.

(21) Appl. No.: 10/202,636

(22) Filed: Jul. 25, 2002

(65) Prior Publication Data
US 2003/0110488 A1 Jun. 12, 2003

(30) Foreign Application Priority Data
Dec. 11, 2001 (KR) .................................. 2001-78180

(51) Int. Cl.
*H04N 7/16* (2011.01)
(52) U.S. Cl. ............. 725/30; 725/25; 725/28; 713/183; 713/185; 713/186
(58) Field of Classification Search .................... 725/25, 725/28, 30; 713/183, 185, 186
See application file for complete search history.

(56) References Cited

U.S. PATENT DOCUMENTS

| | | | | |
|---|---|---|---|---|
| 5,410,598 A * | 4/1995 | Shear | | 705/53 |
| 5,550,575 A * | 8/1996 | West et al. | | 725/28 |
| 5,892,900 A * | 4/1999 | Ginter et al. | | 726/26 |
| 5,973,683 A * | 10/1999 | Cragun et al. | | 715/719 |
| 6,163,272 A * | 12/2000 | Goode et al. | | 725/30 |
| 6,530,083 B1 * | 3/2003 | Liebenow | | 725/46 |
| 6,564,005 B1 * | 5/2003 | Berstis | | 386/83 |
| 6,701,523 B1 * | 3/2004 | Hancock et al. | | 725/25 |
| 6,745,223 B1 * | 6/2004 | Nobakht et al. | | 709/200 |
| 7,051,360 B1 * | 5/2006 | Ellis et al. | | 725/136 |
| 7,080,399 B1 * | 7/2006 | Yanagawa et al. | | 725/109 |
| 7,376,751 B2 * | 5/2008 | Gautier | | 709/245 |
| 2002/0049738 A1 * | 4/2002 | Epstein | | 707/1 |
| 2003/0190136 A1 * | 10/2003 | Yamamoto | | 386/46 |
| 2003/0237093 A1 * | 12/2003 | Marsh | | 725/46 |

FOREIGN PATENT DOCUMENTS
JP 2000-196970 7/2000
KR 1999-0068942 9/1999

OTHER PUBLICATIONS http://www.petri.co.il/images/xp_welcome_screen.jpg.*
http://www.microsoft.com/presspass/press/2001/aug01/08-24WinXPRTMPR.mspx.*
Windows XP Office XP, Jun. 2001.

* cited by examiner

*Primary Examiner* — Pankaj Kumar
*Assistant Examiner* — Sahar Baig
(74) *Attorney, Agent, or Firm* — Staas & Halsey LLP

(57) ABSTRACT

A method and apparatus for setting a TV operation environment for users submitting authorizing passwords. The method of setting a user environment of a television (TV) includes displaying a plurality of icons of Identifications (IDs) for respective users, each of the IDs corresponding to an operation environment for a user. If an ID icon is selected among the displayed icons, a password corresponding to the selected ID icon is authenticated, and if a user is authenticated by the password, a preset operation mode for the user is set.

19 Claims, 3 Drawing Sheets

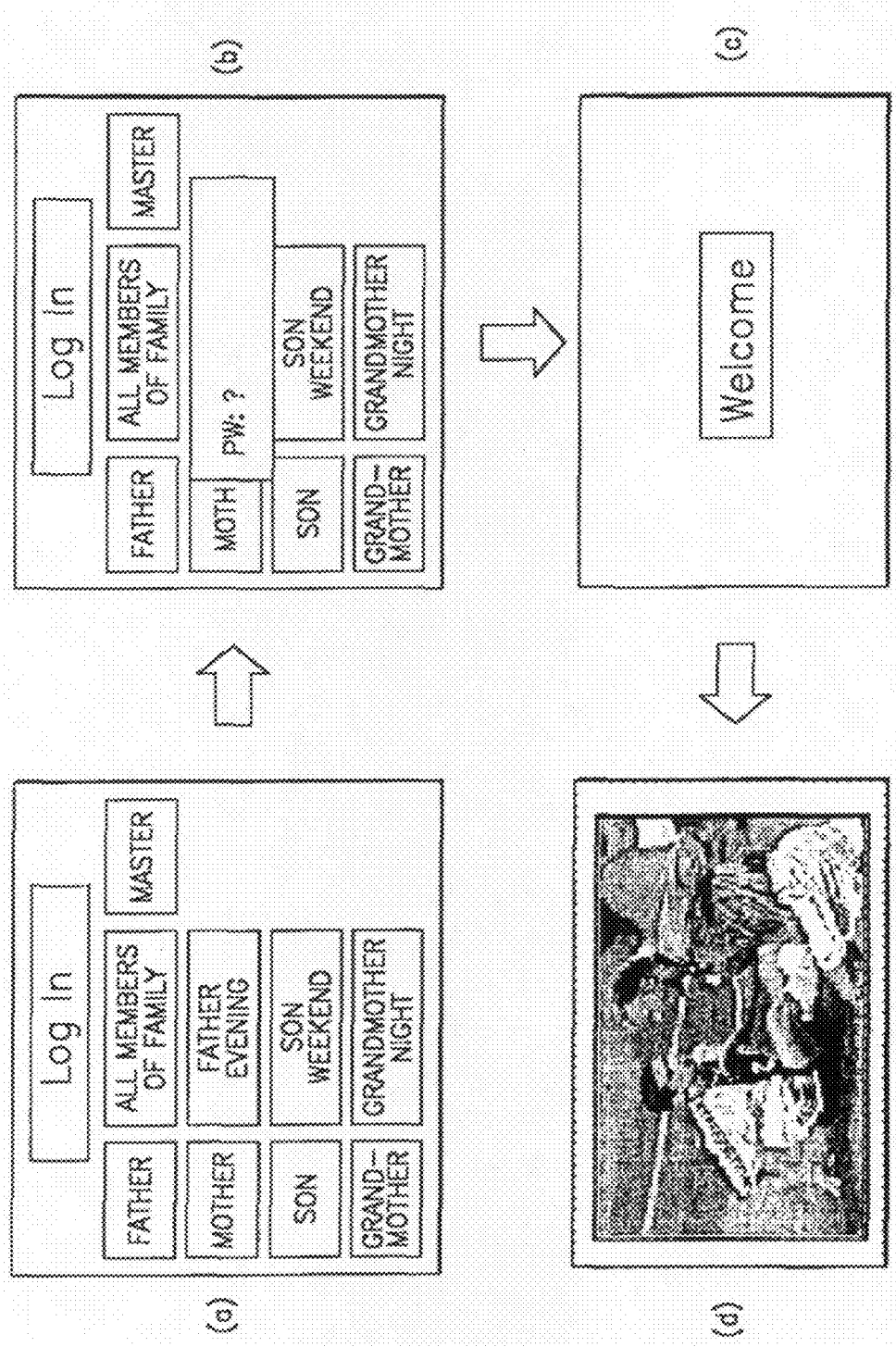

METHOD FOR SETTING TV ENVIRONMENT THROUGH USER AUTHENTICATION AND APPARATUS THEREOF

CROSS-REFERENCE TO RELATED APPLICATIONS

This application claims the benefit of Korean Application No. 2001-78180, filed Dec. 11, 2001 in the Korean Industrial Property Office, the disclosure of which is incorporated herein by reference.

BACKGROUND OF THE INVENTION

1. Field of the Invention

The present invention relates generally to a digital television (TV) system, and more particularly, to a method and apparatus for setting a TV environment in which a TV operation environment is set for each user through user authentication.

2. Description of the Related Art

In general, a TV system is a system that enables TV viewers to watch TV programs by processing broadcast signals containing the TV programs. The TV that is rapidly being developed is a multimedia apparatus where TV viewers can access a variety of information, regardless of age or general authority to access the same.

Recently, solid security has been demanded in apparatuses transmitting or storing a lot of information, such as computers. In the future, when digital TVs become more sophisticated with Internet access functions, security of information will then be a requisite. Particularly, there is a need to restrict access to harmful channels, e.g., restricting teens from watching particular TV programs. Thus, an accurate recognition of users is needed.

In addition, because of differences in age of users, or technological knowledge, there is a need for a more effective way of setting different channels or TV environments, e.g., standard volume states, image states, or sound effects.

Conventional TV systems have employed a method where a user environment is accessed through an On Screen Display (OSD) technique while the TV is turned on. Every user who wants to watch the TV turns on the TV and sets a preferred environment or selects a prestored user environment.

However, this conventional user environment setting includes problems. First, it is inconvenient for every user who wants to watch the TV to have to turn on the TV and set a preferred environment or select a prestored user environment. Second, it is necessary to have a separate menu to control security for information.

SUMMARY OF THE INVENTION

To solve the above problems, it is an object of the present invention to provide a method of setting a TV environment for each user, where user convenience is accomplished by enabling an easy conversion of operation environments and preferred channel settings through user authentication, to satisfy a user's taste and preference in advance before watching the TV.

It is another object of the present invention to provide an apparatus to set a TV environment for each user, such that an operation environment and preferred channel setting are enabled, through user authentication, so as to satisfy the user's taste and preference in advance before watching the TV.

Additional objects and advantages of the invention will be set forth in part in the description which follows and, in part, will be obvious from the description, or may be learned by practice of the invention.

To accomplish the above and other objects, an embodiment of the present invention provides for a method of setting a user environment of a television (TV), including displaying a plurality of icons of Identifications (IDs) for respective users, with each of the IDs corresponding to an operation environment for a particular user. If an ID icon is selected among the displayed icons, a password is required to be authenticated corresponding to the selected ID icon. If the user is authenticated by the password, a preset operation mode for that user is then enabled.

To accomplish the above and other objects, an embodiment of the present invention provides for an apparatus to enable a user environment of the TV, including an input unit to generate an ID and password for each user, a memory unit to set operation environment parameters for each user for each user ID, and to store the parameters, a signal output unit to output a TV signal, and a control unit to receive an ID and password from the input unit, process user authentication, and set output signals of the signal output unit to environment parameters for each user stored in the memory unit.

BRIEF DESCRIPTION OF THE DRAWINGS

These and other objects and advantages of the invention will become more apparent and more readily appreciated from the following description of the preferred embodiments, taken in conjunction with the accompanying drawings of which:

FIG. 3 is a diagram of a further embodiment of the present invention showing a method of setting a TV environment on a screen.

DETAILED DESCRIPTION OF THE PREFERRED EMBODIMENTS

Figure 1:
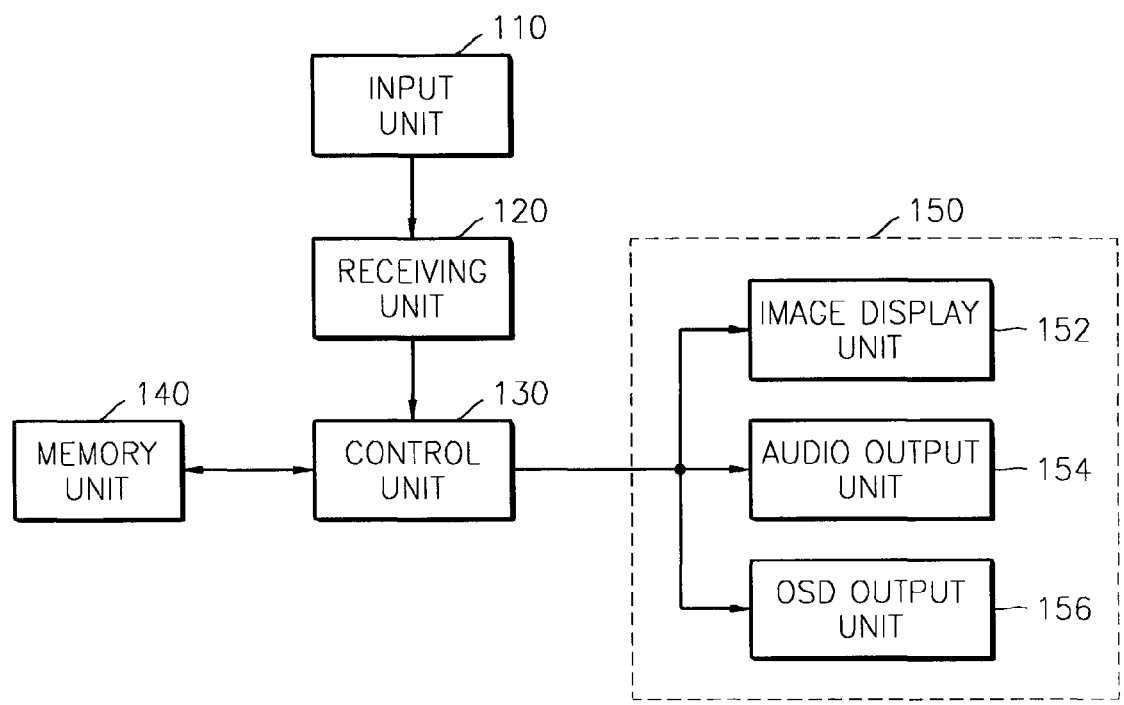
FIG. 1 is a block diagram of an embodiment of the present invention for setting a TV environment.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an embodiment of the present invention for setting a TV environment, including an input unit 110, a receiving unit 120, a control unit 130, a memory unit 140, and a signal output unit 150. The signal output unit 150 includes an image output unit 152, an audio output unit 154, and an OSD output unit 156.

Referring to FIG. 1, the input unit 110 may correspond to a remote controller, through which a user inputs the user's own proper number (hereinafter referred to as "ID") and a password in order to set a desired environment.

The receiving unit 120 may receive the ID and password from the input unit 110 wirelessly or via wire.

The memory unit 140 stores operation environment parameters for each user, for example, a picture quality, color preference, sound effect, an OSD location, and preferred channel list information.

The control unit 130 processes user authentication by receiving the ID and password from the input unit 110. If the user's password is the same as a prestored code, the control unit 130 sets signal output parameters of the elements of the signal output unit 150, that is, the image output unit 152, the audio output unit 154, and the OSD output unit 156, to environment parameters for each user stored in the memory unit 140. Also, the control unit 130 sets a channel according to a preferred channel list stored in the memory unit 140. In addition, the control unit 130 issues an ID for each user through a master ID, sets authorization rights for access to particular channels, and displays a plurality of user IDs as icons on the screen in an initial user environment mode.

Figure 2:
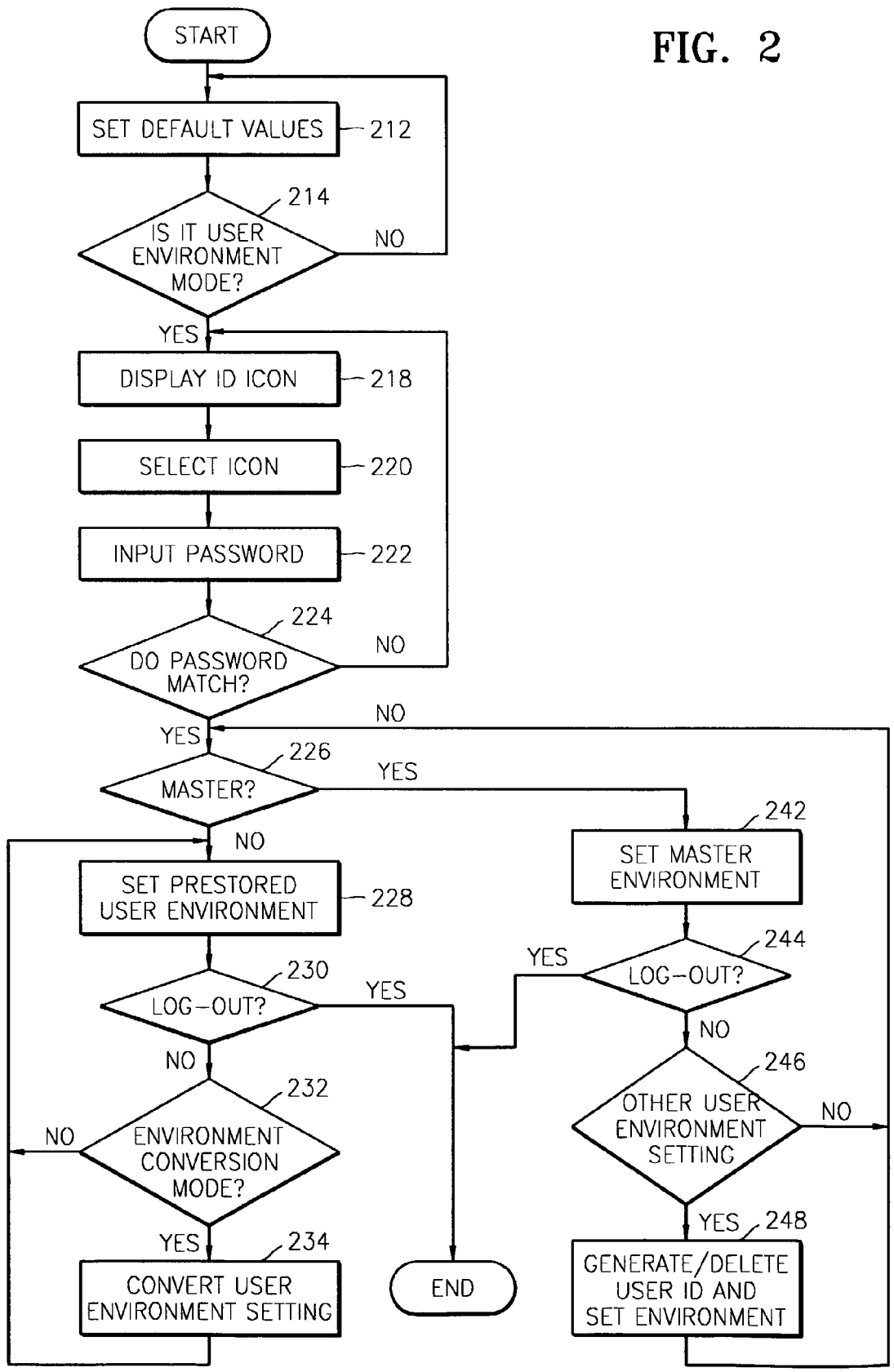
FIG. 2 is a flowchart of an embodiment of the present invention for setting a TV environment.

FIG. 2 is a flowchart of an embodiment of the present invention for setting a TV environment.

First, a master ID, which manages IDs and passwords of all users, is set in an initial phase, in step 212. Using the master ID, an ID and operation environment for each user can be stored in the memory. Examples of the operation environment include a preferred channel list, sound effect, volume level, and a screen state that the user prefers, though it is not limited thereto.

Then, when power is provided, the TV operates in the operation environment of a channel that is set to default values.

Next, it is determined whether or not a user environment mode key is input, in step 214.

Next, if the user environment mode key is input, each of the IDs for users are displayed in the form of icons, in step 218. An example of this is shown as section (a) of FIG. 3. That is, on the screen, ID icons for "father", "mother", "son", "grandmother", "all members of family", and "MASTER" are displayed. At this time, "MASTER" manages all IDs displayed on the screen.

Next, if the user selects a desired ID icon, in step 220, a scene requesting the user to input the user's password is displayed. An example of this is shown as section (b) of FIG. 3.

If the user selects an icon "father evening," a scene requesting the password for the icon is displayed. At this time, in a further embodiment, instead of displaying the ID icon on the screen, the user may request a password input scene by inputting the user's ID to the input terminal of the TV. At this time, with one user ID, a plurality of users can access the TV. For example, the ID "all members of family," as shown in section (a) of FIG. 3, can be shared by a plurality of authenticated users. Also, one user can access the TV with a plurality of IDs. For example, as shown in section (a) of FIG. 3, a plurality of IDs such as "father" and "father evening" can be used by one user.

Next, if the user inputs a password, in step 222 of FIG. 2, it is determined whether or not the input password is correct, in step 224. At this time, if the password input by the user is not the same as a stored code, the scene displaying ID icons appears again.

If the password input by the user is the same as the stored code, an acceptance scene, as illustrated in section (c) of FIG. 3, is displayed.

Next, if the password authentication is successfully finished, the TV environment is set to a user environment that is stored in memory, in step 228 of FIG. 2. If the user logs out, in step 230, the user environment is terminated, and a scene of the default environment setting is executed. At this time, in another embodiment, if the authentication is successfully finished, preferred channel lists set for respective users may be displayed.

At this time instead of logging out, if a user environment conversion key is input, in step 232, the previous user environment stored in memory is converted into another environment, in step 234.

Meanwhile, if the authenticated password is the master ID, in step 226, the master environment for managing all user IDs and passwords is set, in step 242. At this time instead of logging out, in step 244, if another user environment setting key is input, in step 246, the master generates an ID for the other users and sets environments for the user, in step 248. Also, the master may delete user IDs and environments.

The present invention may be embodied in code, which can be read by a computer, e.g., on a computer readable recording medium or transmitted to the computer in carrier waves, noting that code may include applets performing portions of the present invention or an entire program for controlling the computer to perform the present invention. The computer readable recording medium may also include all kinds of recording apparatuses on which computer readable data are stored.

The computer readable recording media can include storage media such as magnetic storage media (e.g., ROMs, floppy disks, hard disks, etc.) and optically readable media (e.g., CD-ROMs, DVDs, etc.). The computer readable recording media may also include the aforementioned carrier waves (e.g., transmissions over the Internet or an Intranet). Also, the computer readable recording media can be scattered on computer systems connected through a network and can store and execute a computer readable code in a distributed mode.

As described above, according to embodiments of the present invention, preferred channels, sound effects, volume levels, and screen states that a user likes are stored in advance, and through authentication, the preset environment can be protected from other users access. For a family with children, the children can be protected from harmful channels. Also, since the master ID manages all the user IDs and passwords, a plurality of people can access a user environment with one ID.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of setting a personalized user environment for a television comprising a screen, a memory, and a processor, comprising:
   registering at least one user to at least one personalized user setting, wherein each user setting defines a personalized television user environment for the at least one user or at least one group of users
   displaying on the screen a plurality of identifications (IDs) symbols for the at least one personalized user setting;
   in response to a selection of one of the plurality of ID symbols by a user, prompting an authentication request to the user for a log in process on the screen;
   receiving authentication information from the user and authenticating by comparing the received authentication information with each of preregistered authentication information stored in the memory;
   if the received authentication information matches with one of the preregistered authentication information, changing an operation mode of the television user environment to the personalized television user environment corresponding to the personalized user setting for the selected ID symbol;

wherein the at least one ID symbol for the at least one users and the at least one personalized user setting for the at least user is selectively enabled to be registered by a master user, wherein the master user is selectively enabled to assign each of the plurality of ID symbols to the at least one user or the at least one group of users, wherein the operation mode of the television user environment comprises at least one of picture quality, color preference, sound effect, and an on-screen-display location, and wherein the processor is configured to change the operation mode of the television environment to a default setting when a log out by the user.

2. The method of claim 1, wherein the operation mode is a preferred channel list for the corresponding at least one user or at least one group of users.

3. The method of claim 1, further comprising:
displaying a channel list for the corresponding at least one user or at least one group of users on the screen if the received authentication information is validated.

4. The method of claim 1, wherein the master user is selectively enabled, compared to a non-master user, to manages all IDs symbols and preregistered authentication information of the respective users or group of users.

5. The method of claim 1, wherein the master user is selectively enabled, compared to a non-master user, to delete at least one ID symbol and corresponding personalized user setting.

6. The method of claim 1, further comprising:
selectively enabling a master user, compared to a non-master user, to set user IDs symbols and personalized user settings for other users if the received authentication information is confirmed as that of the master user.

7. The method of claim 1, further comprising:
switching to the default setting if the received authentication information does not match one of the preregistered authentication information.

8. The method of claim 1, wherein the master user is selectively enabled, compared to a non-master user, to generate the plurality of ID symbols for the respective users, with at least two ID symbols, representing the same user, being displayed with at least one additional displayed symbol representing a different user.

9. An apparatus for setting a television personalized user environment, comprising:
an input unit to generate an ID and password for each of a plurality of users and/or group of users by registering at least one user to at least one personalized user setting, wherein each personalized user setting defines a personalized television user environment for the at least one user or at least one group of users;
a memory unit;
a signal output unit to output a television signal to display on a screen a plurality of identification (ID) symbols for the at least one personalized user setting;
a control unit, in response to a selection of one of the plurality of ID symbols by a user, to prompt an authentication request to the user on the screen for a log in process, to receive authentication information from the user, and to authenticate by comparing the received authentication information with each of preregistered authentication information stored in the memory unit;

if the received authentication information matches with one of the preregistered authentication information, changing an operation mode of the television user environment to the personalized television user environment corresponding to the personalized user setting for the selected ID symbol wherein each user within the group of users is authenticated based on a selection of a same ID symbol, of the plurality of ID symbols, and a same preregistered authentication information, wherein the operation mode of the television user environment comprise at least one of picture quality, color preference, sound effect, and an on-screen-display location, and wherein the control unit selectively changes the Operation mode of the television environment to a default setting when a log out by the user.

10. The apparatus of claim 9, wherein the signal output unit further comprises an image output unit to display the television signal, an audio output unit to output audible information from the television signal, and/or an on-screen-display output unit to control the display of on-screen information.

11. The apparatus of claim 10, wherein the signal output unit displays ID symbols in the form of icons for each of the plurality of users or group of users.

12. The apparatus of claim 11, wherein the selection of the one of the plurality of ID symbols is input by selecting one of the icons, the authentication information is input after displaying the prompting of the authentication request by the signal output unit.

13. The apparatus of claim 9, wherein the input unit is a remote controller.

14. The apparatus of claim 9, wherein the control unit is configured to receive the selection of the ID symbol and authentication information wirelessly.

15. The apparatus of claim 9, wherein, when the ID symbol represents at least one user, the user authentication includes comparing the authentication information to at least one preregistered authentication information.

16. The apparatus of claim 9, wherein another user outside of the group of users is authenticated based on a selection of a different displayed ID symbol, of the plurality of displayed ID symbols, by the other user and different preregistered authentication information.

17. A non-transitory computer-readable storage medium causing a computer to execute a personalized user environment setting method for a television comprising a screen, a memory, and a processor, the method comprising:
detecting an input by a user for selection of one of a plurality of displayed ID symbols, and prompting an authentication request to the user on the screen for a log in process;
receiving authentication information from the user and authenticating by comparing the received authentication information with each of preregistered authentication information stored in the memory;
if the received authentication information matches with one of the preregistered authentication information, changing an operation mode of a television user environment to a personalized television user environment corresponding to a personalized user setting for the selected ID symbol, wherein at least one user is preregistered to at least one personalized user setting, and wherein each user setting defines a personalized television user environment for the at least one user or at least one group of users, wherein each user, of a plurality of users, within a group of select users is authenticated based on a selection of a same ID symbol, of the plurality of ID symbols, and a same preregistered authentication information, wherein the operation mode of the television user environment comprises at least one of picture quality, color preference, sound effect, and an on-screen-display location, and wherein the processor is configured to change the operation mode of the television user environment to a default setting if a logout by the user.

18. The medium of claim 17, comprising controlling information relating to IDs symbols to be displayed in the form of icons for each user or user group along with icons for a plurality of other users and/or user groups.

19. The medium of claim 17, wherein another user outside of the group of users is authenticated based on a selection of a different displayed ID symbol, of the plurality of displayed ID symbols, by the other user and different prereqistered authentication information.

* * * * *